(12) United States Patent
Li (10) Patent No.: US 11,485,444 B2
(45) Date of Patent: Nov. 1, 2022

(54) LUGGAGE SCOOTER

(71) Applicant: Dennis Li, La Mirada, CA (US)

(72) Inventor: Dennis Li, La Mirada, CA (US)

( * ) Notice: Subject to any disclaimer, the term of this patent is extended or adjusted under 35 U.S.C. 154(b) by 413 days.

(21) Appl. No.: 16/862,862

(22) Filed: Apr. 30, 2020

(65) Prior Publication Data

US 2021/0339817 A1 Nov. 4, 2021

(51) Int. Cl.
  *B62K 15/00* (2006.01)
  *B62K 21/18* (2006.01)
  *B62B 3/02* (2006.01)
  *B62K 19/46* (2006.01)
  *B62K 3/00* (2006.01)
  *B62B 3/00* (2006.01)

(52) U.S. Cl.
  CPC .............. *B62K 19/46* (2013.01); *B62B 3/009* (2013.01); *B62B 3/02* (2013.01); *B62K 3/002* (2013.01); *B62K 15/006* (2013.01); *B62K 21/18* (2013.01); *B62B 2202/24* (2013.01)

(58) Field of Classification Search
  CPC .......... B62K 19/46; B62K 3/002; B62K 3/10; B62K 15/00; B62K 15/006; B62K 21/18; B62B 3/009; B62B 3/02; B62B 2202/90; B62B 2206/006; B62B 2205/04; A45C 2009/005; A45C 9/00
  See application file for complete search history.

(56) References Cited

U.S. PATENT DOCUMENTS

| 554,685 | A | * | 2/1896 | Hartson | ............................ 280/37 |
| 3,314,494 | A | * | 4/1967 | Weitzner | ................ B62K 15/00 280/87.041 |
| 7,077,229 | B2 | * | 7/2006 | Lee | .......................... B62K 3/002 180/181 |
| 7,793,949 | B2 | * | 9/2010 | Wang | .................... B62K 15/006 280/37 |
| 8,833,777 | B2 | | 9/2014 | Turner | |
| 9,090,274 | B1 | * | 7/2015 | Arjomand | ............ B62K 15/006 |
| 9,302,728 | B1 | | 4/2016 | Yang | |
| 9,504,901 | B1 | * | 11/2016 | Lu | .......................... B62K 15/006 |
| 9,604,688 | B1 | * | 3/2017 | Yang | ........................ B62K 3/10 |
| 10,023,254 | B1 | * | 7/2018 | Nilsen | ......................... B62J 1/08 |
| 10,206,469 | B2 | | 2/2019 | Pickavance | |

(Continued)

FOREIGN PATENT DOCUMENTS

| CN | 108248746 A | * | 7/2018 | |
| CN | 109484554 A | * | 3/2019 | ........... B62K 15/006 |

(Continued)

*Primary Examiner* — Steve Clemmons
(74) *Attorney, Agent, or Firm* — Clement Cheng (57) ABSTRACT

A luggage scooter has a middle frame, a front wheel section, a seat section, and a rear wheel section. The front wheel section has a front wheel frame pivotally connected to the middle frame at a front wheel frame joint. The front wheel frame is mounted to a steering joint. The steering joint is mounted on the middle frame. The steering joint provides steering in both a left and right direction. The front wheel frame joint provides the front wheel frame with configurable position between a stowed position and a deployed position. A front wheel is mounted to the front wheel frame at a front wheel support. A rear wheel section has a rear wheel frame pivotally connected to the middle frame at a rear wheel frame joint.

17 Claims, 6 Drawing Sheets

(56) References Cited

U.S. PATENT DOCUMENTS

| | | | |
|---|---|---|---|
| 10,384,556 B1* | 8/2019 | Miyata | B62K 15/006 |
| 10,486,763 B2* | 11/2019 | Koo | B62K 3/002 |
| 11,230,343 B2* | 1/2022 | Chiu | B62K 15/006 |
| 2002/0104863 A1 | 8/2002 | Jones | |
| 2005/0077097 A1* | 4/2005 | Kosco | B62K 5/025 |
| | | | 180/208 |
| 2009/0315301 A1 | 12/2009 | Athalye | |
| 2013/0062377 A1 | 3/2013 | Turner | |
| 2015/0209205 A1 | 7/2015 | Ransenberg | |
| 2016/0339984 A1 | 11/2016 | Li | |
| 2021/0301571 A1* | 9/2021 | Xie | F16B 2/065 |

FOREIGN PATENT DOCUMENTS

| | | | | |
|---|---|---|---|---|
| CN | 110182287 A | * | 8/2019 | |
| DE | 10057951 A1 | * | 5/2002 | B62K 15/006 |
| WO | WO-2018013069 A1 | * | 1/2018 | |
| WO | WO-2018169438 A1 | * | 9/2018 | |
| WO | WO-2019033015 A1 | * | 2/2019 | |

* cited by examiner

LUGGAGE SCOOTER

FIELD OF THE INVENTION

The present invention is in the field of luggage scooters.

DISCUSSION OF RELATED ART

Luggage scooters are luggage that transform between a luggage mode and a scooter mode.

A variety of different prior art references show various configurations of luggage scooters. For example, in the U.S. Pat. No. 8,833,777, Combination Scooter And Messenger Bag by inventor Michael Hughesdon Turner, published Sep. 16, 2014 the abstract discloses, "The combination scooter and messenger bag is an article-carrying device that can be converted into a wheeled land vehicle. When used as an article carrying device, the invention resembles a conventional messenger bag with a single strap. This is known as "carrying mode." When used as a wheeled land vehicle, the invention resembles a kick scooter. This is known as "riding mode." The invention employs a mechanism that quickly and easily converts the combination scooter and messenger bag from "carrying mode" to "riding mode" and vice versa. Raising the handlebar shifts the messenger bag from on top of the footboard to the side of the footboard. Lowering the handlebar shifts the messenger bag in the apposite direction. In this way, the scooter footboard is largely hidden from view in "carrying mode" and exposed for a user to stand upon in "riding mode"."

For example, in the United States publication number 2009/0315301 A1, Scooter Luggage by inventor Ravi Athalye, published Dec. 24, 2009 the abstract discloses, "Globalization has created a culture of frequent air travel. This has in turn required the luggage to be optimized for effortless transport and sized to conform to storage compartments available on airplanes. The Roll On wheeled luggage that is sized to fit in the overhead bins in the plane has become popular with the short stay frequent traveler since it eliminates the time involved in checking in the luggage for storage in the plane undercarriage. The current invention, called the Scooter Luggage is for the needs of the extremely mobile and agile population. Scooter Luggage converts the conventional Roll On wheeled luggage to a three wheeled scooter. It integrates a third wheel, a platform to stand and a steering mechanism that enables the user to use the luggage to scoot from terminal to terminal. The design is foldable so that the luggage still conforms to the air plane overhead bin format. It also has a miniature fork lift feature so that the Scooter Luggage can be loaded with other items for transporting. The Scooter Luggage is configurable for airport shopping convenience. The Scooter Luggage retains the functionality of a conventional Roll On luggage."

For example, in the U.S. Pat. No. 9,090,274, Convertible Cargo Container by inventor Hamid Arjomand, published Jul. 28, 2015 the abstract discloses, "An apparatus which is convertible from a portable cargo container to a wheeled vehicle. In particular, the present invention is a backpack or article of luggage that includes a deployable wheeled platform so that the backpack or luggage is convertible to a scooter type vehicle. The present invention is particularly useful for transporting relatively heavy loads along with a human operator, quickly and with minimal effort."

For example, in the United States publication number 2015/0209205 A1, Motorized Vehicle Tube by inventor Abraham-Nino Ransenberg, published Jul. 30, 2015 the abstract discloses, "A motorized vehicle having a wheel retraction apparatus, comprising: a plurality of rear wheels and at least one front wheel; a lower chassis having a foot surface mounted thereon; and a wheel retraction apparatus mechanically connected to said lower chassis and set to extract and retract said plurality of rear wheels from and towards said lower chassis and to fixate said plurality of rear wheels in a plurality of different widths from one another; wherein a distance between an axis passing through the centers of said plurality of rear wheels and said at least one front wheel is reduced when said plurality of rear wheels are retracted towards said lower chassis."

For example, in the United States publication number 2016/0339984 A1, Scooter Luggage by inventor Jian Li, published Nov. 24, 2016 the abstract discloses, "A limiting plate control device is for a scooter luggage. The device includes first and second shells that form a cavity shell, and a sliding pressing block, first and second sliders, and first and second elastic elements that are all located within the cavity shell. The device comprises an extrusion mechanism configured to allow the first slider protrusion to retract into the cavity shell by pushing the pressing block and to allow the second slider protrusion to retract by further pushing the pressing block. The device has a simple structure and is easy to operate. Moreover, a button shell for a scooter luggage is provided. The button shell has a spilt frame which includes a first baffle with a limiting bump and a second baffle with a limiting groove. The button shell has a simple structure and is easy to assemble and operate."

For example, in the U.S. Pat. No. 10,206,469, Item Of Luggage by inventor Simon Pickavance, published Feb. 19, 2019 the abstract discloses, "The present invention provides an item of luggage (1) having a receptacle (2) to receive items to be transported, a support (14) for the receptacle, a pair of wheels (5, 6) connected to the support (9) and a handle (3) connected to the support (14), with the support (9), receptacle (2), wheels (5, 6) and handle (3) being arranged such that the handle (3) may be used to push or pull the receptacle (2) along on the pair of wheels (5, 6) in the manner of a conventional flight bag. The item further comprises a footplate (11) pivotally attached to the support at one end and with a wheel at the other end. The (footplate 11) is pivotable between a folded position where it lies substantially adjacent the receptacle (2) and an extended position where the footplate (11) extends away from the receptacle (2), wherein, when the footplate (11) is in an extended position, the said pair of wheels (5, 6), the footplate (11) and the handle (3) form a scooter, The invention may, for example, be applied to a piece of carry-on luggage for an aircraft and may thus encourage a child to transport the item through the airport and make the experience more fun for that child."

For example, in the United States publication number 2002/0104863 A1, Scooter Bag by inventor Josephine Jones, published Aug. 8, 2002 the abstract discloses, "A Scooter Bag includes a bag designed for use with modern scooters that are foldable between a use configuration and a storage configuration. Specifically, the Scooter Bag of the present invention includes a bag having a chamber sized to receive a scooter in its storage configuration, and that is wearable as a backpack while containing the scooter. The Scooter Bag is convertable to a second, folded configuration also wearable as a backpack, but smaller in size for wearing during operation of the scooter. In this manner, the Scooter Bag provides a storage solution for scooter riders while they are not riding the scooter, but is also portable such that the bag can be worn while riding the scooter, and may include traditional backpack pouches and accessories."

For example, in the U.S. Pat. No. 9,302,728, Scooter Structure by inventor Kuan-Li Yang, published Apr. 5, 2016 the abstract discloses, "A scooter structure includes a vertical frame and a pedal body. The bottom of the vertical frame connects to (a) front wheel(s). The rear end of the pedal body connects to (a) rear wheel(s), the front end of the pedal body connects to an auxiliary supporter. The auxiliary supporter includes a pivoting portion pivoted at the bottom of the vertical frame and an extension element located higher than that of the pivoting portion. The extension element connects to auxiliary wheels by an assembling component. The pedal body uses the pivoting portion as the rotation shaft, and is selectively rotated between an expansion position (the pedal body is away from the vertical frame and the rear wheel is on the ground) and a folded position (the pedal body is close to the vertical frame and the auxiliary wheels are on the ground) with respect to the vertical frame."

For example, in the U.S. Pat. No. 7,077,229, Folding And Portable Electric Scooter by inventor Shuei-Yuan Lee, published Jul. 18, 2006 the abstract discloses, "A folding and portable electric scooter assembled from structural members including a body member, a cover member, a seat frame and handles. When the electric scooter is not in use, a user needs only employ three simple actions to facilitate rapid folding away of a portable electric scooter, namely to fold down handles into the cover member, and fold away the cover member and the seat frame into the body member, whereupon, the user can pull a pull rod configured atop the cover member to easily pull along the electric scooter by means of auxiliary wheels connected to the body member, similar to the pulling of a baggage."

For example, in the United States publication number 2013/0062377A1, Interchangable Scooter And Article Carrier System by inventor Michael Hughesdon Turner, published May 14, 2013 the abstract discloses, "The Interchangable Scooter and Article Carrier System is a customizable system wherein a kick scooter can be releasably attached to an article carrier, forming a single reconfigurable device that can be used as either a kick scooter or an article carrier. The user can ride the device as a scooter with simultaneous support of the article carrier, or the user can carry the device as an article carrier with simultaneous storage of the scooter. The system utilizes a releasable connection between a rigid frame, attached to a walled container, and a scooter bracket, attached to a portion of the scooter. The scooter bracket is of a multi-part construction so as to be installed on pre-existing commercially available scooters. A deflective interaction between the rigid frame and clamps of the scooter steering assembly creates a selective lock which can maintain the steering position of a front wheel or wheels."

The above prior art publications are incorporated herein by reference.

SUMMARY OF THE INVENTION

A luggage scooter has a middle frame, a front wheel section, a seat section, and a rear wheel section. The front wheel section has a front wheel frame pivotally connected to the middle frame at a front wheel frame joint. The front wheel frame is mounted to a steering joint. The steering joint is mounted on the middle frame. The steering joint provides steering in both a left and right direction. The front wheel frame joint provides the front wheel frame with configurable position between a stowed position and a deployed position. A front wheel is mounted to the front wheel frame at a front wheel support. A rear wheel section has a rear wheel frame pivotally connected to the middle frame at a rear wheel frame joint.

The rear wheel frame pivots away from the front wheel frame when the rear wheel frame pivots from a stowed position to a deployed position. A seat section has a seat frame pivotally connected to the middle frame at a seat frame joint. A handlebar section has a handlebar frame. The handlebar frame is pivotally mounted to the middle frame. The handlebar frame is configured to control the steering of the front wheel frame via the steering joint.

The rear wheel frame covers the front wheel frame when the rear wheel frame and the front wheel frame are both folded to a stowed position. The seat joint is mounted at a corner edge of the middle frame. The seat section has a seat top with a seat top left wing and a seat top right wing. The seat frame includes a handlebar retainer socket configured to retain the handlebar frame when the handlebar frame is folded to a stowed position. The goal el frame further includes a rear wheel frame top surface that forms a fender for covering the rear wheel. The front wheel frame forms a fender for covering the front wheel. The seat frame includes a seat bottom that abuts a rear wheel frame top surface formed on the rear wheel frame. A handlebar cover is mounted above the middle frame. The handlebar cover is parallel to the seat section when the seat section is in a stowed position.

The following call out list of elements can be a useful guide in referencing the elements of the drawings.
10 Luggage Scooter
20 Rear Section
21 Rear Wheel Frame
22 Rear Wheel
23 Rear Wheel Support Axle
24 Rear Wheel Support
25 Rear Wheel Frame Joint
26 Rear Wheel Mount
27 Rear Wheel Frame Surface
28 Rear Wheel Frame Latch
29 Tail End
30 Front Section
31 Front Wheel Frame
32 Front Wheel
33 Front Wheel Support Axle
34 Front Wheel Support
35 Front Wheel Frame Joint
36 Foot Rest Bar
37 Foot Rest Extension
38 Foot Rest Joint
39 Steering Joint
40 Seat Section
41 Seat Frame 42 Seat Top
43 Seat Top Right Ring
44 Seat Top Left Wing
45 Seat Frame Joint
46 Seat Bottom
47 Handle Bar Retainer Socket
48 Right Wing Hinge
49 Left Wing Hinge
50 Middle Frame
50 Middle Frame
51 Battery
52 Luggage Lift Handle
55 Left Luggage Wheel
53 Luggage Pull Handle
54 Right Luggage Wheel
55 Left Luggage Wheel
56 Battery Release Notch
60 Handle Bar Section
61 Handle Bar Frame
62 Right Handle Bar
63 Left Handle Bar
64 Right Handle Bar Joint
65 Left Handle Bar Joint
66 Handle Bar Joint
67 Handle Bar Cover

DETAILED DESCRIPTION OF THE PREFERRED EMBODIMENT

Figure 1:
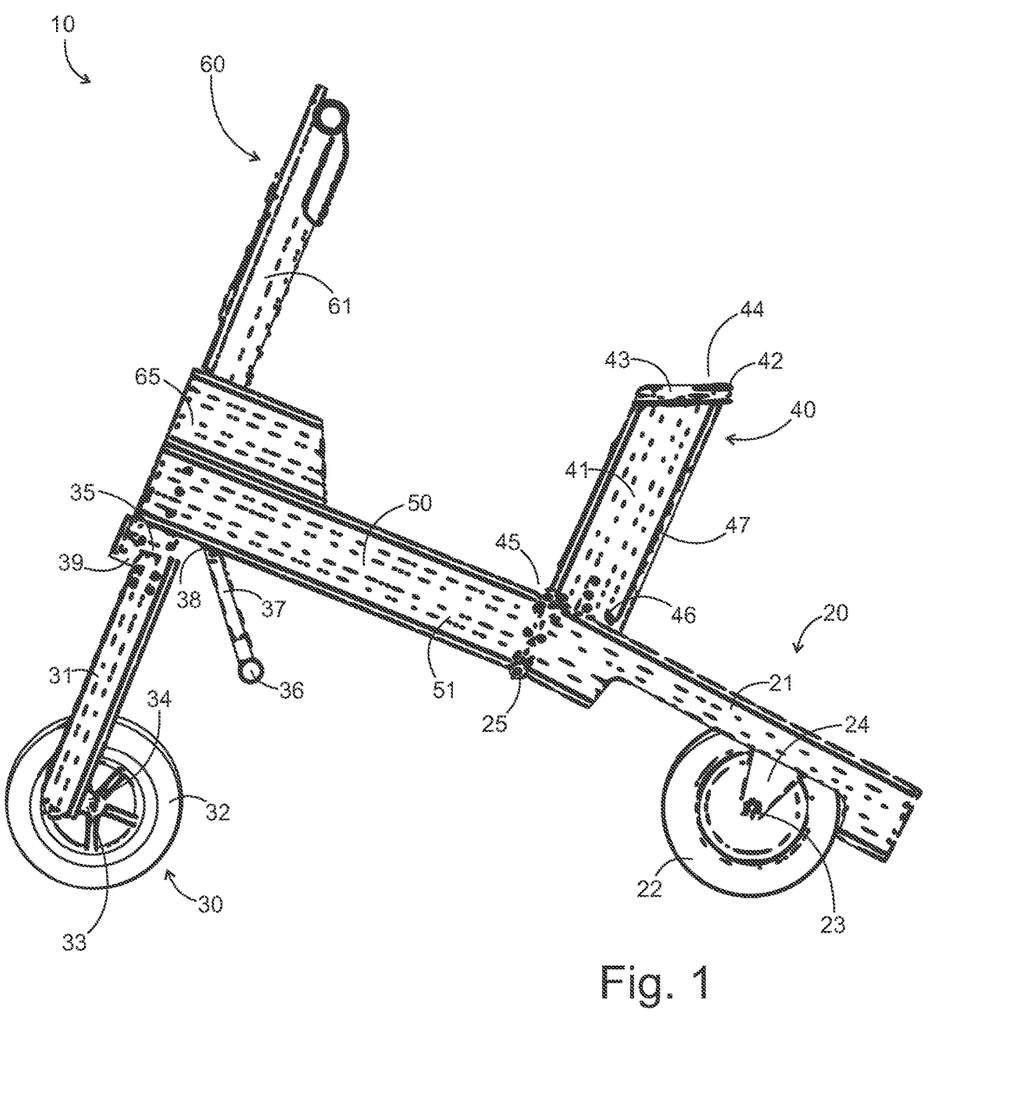
FIG. 1 is a left side view of the present invention in deployed position.

As seen in FIG. 1, the luggage scooter 10 has a rear section 20, a front section 30, a seat section 40, a middle frame 50, and a handlebar section 60. The luggage scooter 10 converts between a luggage mode and a scooter mode. As used in this description, the directional terms such as up, down, refer to the invention as depicted in the drawings and not necessarily how the structure would be oriented during use.

A rear wheel frame 21 has a rear wheel 22 which is mounted on a rear wheel support axle 23 which is mounted on a rear wheel support 24. A rear wheel frame joint 25 connects the rear wheel frame 21 to the middle frame 50. The middle frame 50 houses a battery 51. The rear wheel frame joint 25 is configured as a hinge to allow rotation of the rear wheel frame 21 relative to the middle frame 50. The rear wheel frame joint 25 is configured at a lower rear corner of the middle frame 50, and at a lower front corner of the rear wheel frame 21.

The front section 30 has a front wheel frame 31 supporting a front wheel 32 on a front wheel support axle 33 which is supported by a front wheel support 34. The front wheel frame joint 35 is pivotally mounted to a front underside portion of the middle frame 50. The front wheel frame joint 35 allows the front wheel frame 31 to rotate from a retracted luggage position to an extended scooter position. The front wheel frame joint 35 can be formed as a hinge that rotates the front wheel frame 31 approximately 90°. The front wheel frame 31 is preferably pivotally mounted on the steering joint 39 so that the front wheel frame 31 can rotate and thus steer left to right. The steering joint 39 is connected to the handlebar frame 61 so that rotation of the handlebar frame 61 rotates the steering joint 39.

The middle frame 50 has a foot rest bar 36 mounted to an underside of the middle frame 50. The foot rest bar 36 is mounted to a foot rest extension 37 that is pivotally mounted on a foot rest joint 38 to the middle frame 50. A user can rest a foot on the foot rest bar 36 that extends horizontally. The foot rest extension 37 extends downwardly from the middle frame 50.

The seat section 40 has a seat frame 41 and a seat top 42. The seat top 42 includes a pair of seat top wings, namely a seat top right wing 43 and a seat top left wing 44. The seat frame 41 is pivotally connected to the middle frame 50 at the seat frame joint 45 which is formed between the top rear edge of the middle frame 50 and the bottom front edge of the seat frame 41. The seat frame 41 further includes a seat bottom 46 having a flat surface that abuts a flat upper surface of the rear wheel frame 21.

The handle bar section 60 includes a handlebar frame 61 mounted on a handlebar joint 66. The handlebar joint 66 is mechanically connected to the steering joint 39 so that rotation steering of the handlebar joint 66 is transferred to the steering joint 39. The handlebar retainer socket 47 is formed on a rear portion of the seat section 40 so that when the seat section 40 is rotated, the handlebar joint 66 also rotates the handlebar frame 61 downwardly to lodge within the handlebar retainer socket 47. A saddle shaped recess on the seat top 42 receives the shaft of the handlebar frame 61 to provide a retention between the handlebar retainer socket 47 and the handlebar section 60.

The handle bar retainer socket 47 is elongated and perpendicular to the middle frame 50 when the seat section 40 is in an upright position, but when the seat section 40 is in a folded stowed position, the seat section 40 is parallel to the middle frame 50. The middle frame 50 has a battery 51 that can be removable such as by sliding out. The seat section 40, and the middle frame 50 can be formed of extruded aluminum members. The handlebar frame 61 and the handle bar joint 66 allow steering of the scooter in scooter configuration.

Figure 2:
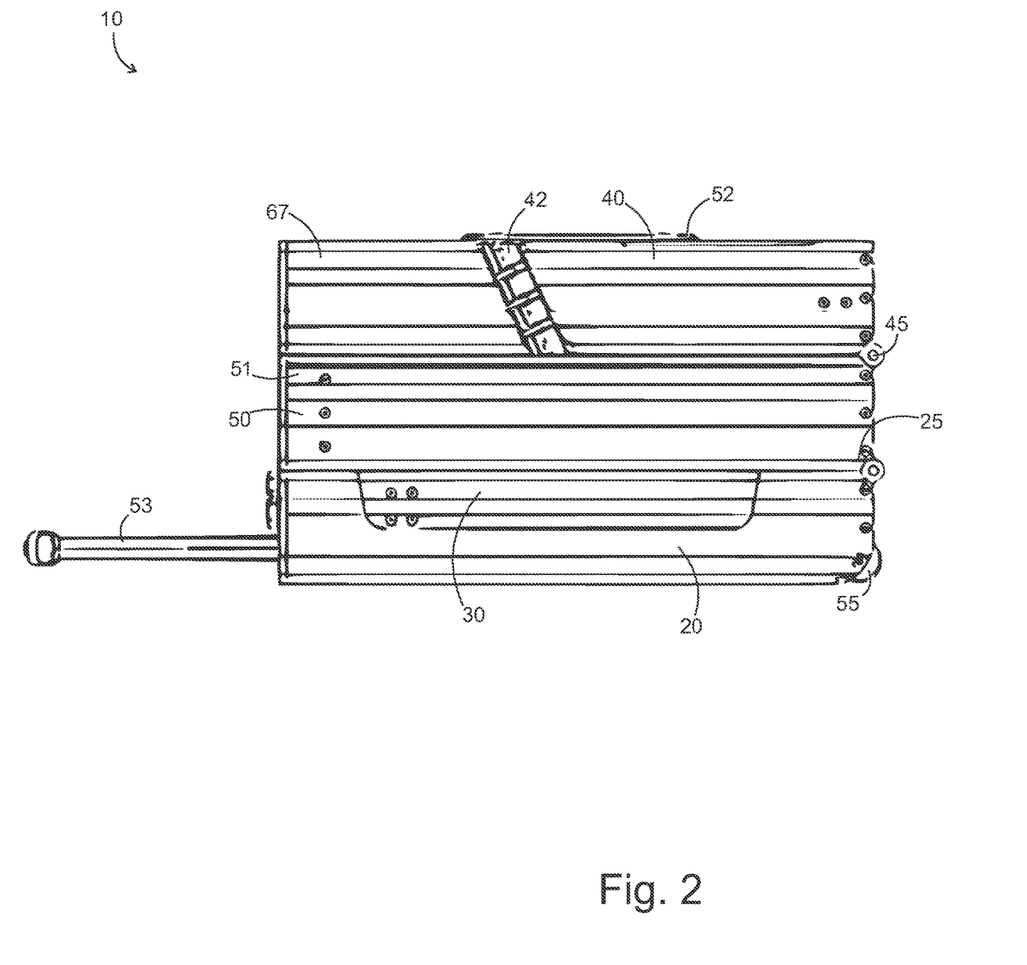
FIG. 2 is a left side view of the present invention in stowed position.

As seen in FIG. 2, from a left side view, the rear section 20 rotates clockwise relative to the middle frame 50 at the rear wheel frame joint 25 to a stowed position. The front section 30 rotates counterclockwise relative to the middle frame 50 at the front wheel frame joint 35 to a stowed position. Also, from a left side view, the seat section 40 with a seat top 42 rotates counterclockwise relative to the middle frame 50 to a stowed position via the seat frame joint 45. Thus, the middle frame 50 is the main frame member that the other sections are attached to. The battery 51 is preferably slidingly mounted to the middle frame 50. The battery 51 preferably powers the front wheel and the rear wheel with hub motors mounted in the wheels. The battery 51 is preferably configured for fast charging and can be lithium-ion or nickel metal hydride chemistry.

When closed, the luggage scooter can be carried by a variety of different handle and lift locations such as the luggage lift handle 52 formed on the handlebar frame 61. A telescopic and retracting luggage pull handle 53 can extend from the rear wheel frame 21, or from the lower portion of the middle frame 50. The luggage scooter also has luggage wheels that are smaller than the drive wheels, namely the front wheel and the rear wheel. The luggage wheels include a left luggage wheel 55 and a right luggage wheel 54.

A handle bar cover 67 covers the handlebar and is made of an extruded aluminum hollow section that continues a profile of the seat frame 41, when the seat frame 41 is parallel to the handlebar cover 67. Preferably, the seat frame 41 and the handlebar cover 67 are configured to appear as if they were a continuous extrusion. A single aluminum extrusion can be cut at an angle to form the handlebar cover 67 and the seat frame 41.

Figure 3:
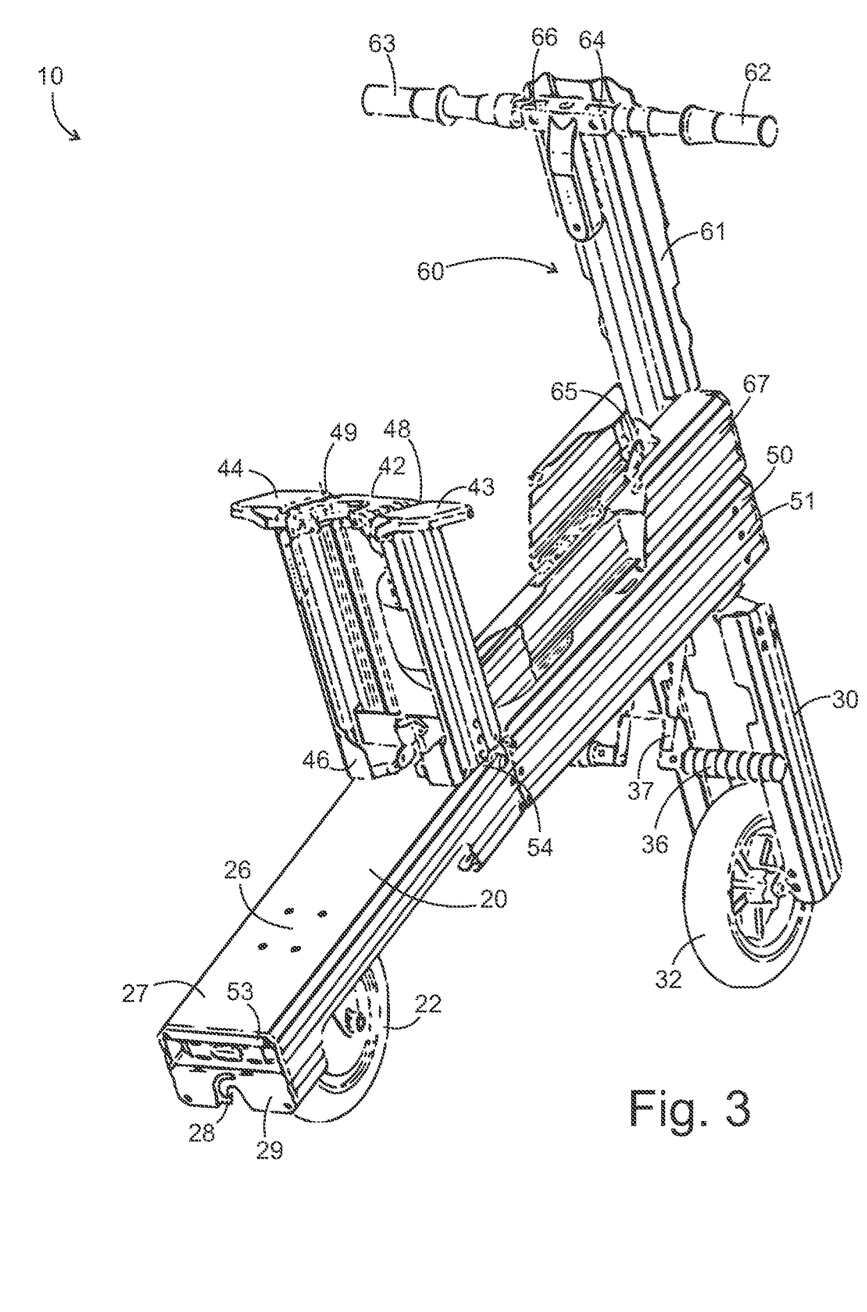
FIG. 3 is a rear right perspective view of the present invention in deployed position.

As seen in FIG. 3, the rear section 20 has a flat upper surface when in scooter mode. The flat upper surface can be a platform for additional stepping area to improve ergonomics. A grip surface can be applied to the flat upper surface. The rear wheel support 24 that supports the rear wheel 22 is mounted at a rear wheel mount 26 on the flat upper surface. The flat upper surface is the rear wheel frame top surface 27.

The rear section 20 also has a rear wheel frame latch 28 at a tail end 29 of the footing scooter. The tail end 29 may have lights, turn signals or safety reflectors mounted thereon. The rear wheel frame top surface 27 forms a fender and wheel well for covering the rear wheel.

The front section 30 retains a front wheel 32 so that the front wheel frame 31 likewise forms a fender and a wheel well for covering the front wheel. The pair of foot rest bars 36 can be pivoted upward and downward relative to the foot rest extension 37 so that the foot rest bars for the way from the foot rest extension 37. In a stowed position, the foot rest bars 36 are parallel to the foot rest extension 37, and in a deployed position, the foot rest bars are perpendicular to the foot rest extension 37. When stowed, the foot rest bars fit into a hollow portion of the front section 30.

The seat top 42 can be made as a folding seat top with a seat top right wing 43 unfolding at a right wing hinge 48 and a seat top left wing 44 unfolding at a left wing hinge 49. The seat bottom 46 abuts the rear wheel frame top surface 27 and can be locked to the rear wheel frame top surface 27 for additional stability. Similarly, the rear section 20 can be locked to the middle frame 50. The battery 51 may also be latched for secure connection within the hollow aluminum extrusion portion of the middle frame 50. The seat bottom 46 is preferably contoured so that it does not engage the right luggage wheel 54, but rather has a hollow portion that partially covers the right luggage wheel 54.

The handle bar section 60 has a handle bar frame 61 with a front face that covers a right handle bar 62 and a left handle bar 63 when the right handlebar 62 is folded downwardly at a right handle bar joint 64 and when the left handlebar 63 is folded downwardly at a left handle bar joint 65. The handle bar cover 67 is configured to match the profile of the handlebar frame 61 so that the luggage scooter 10 when put in a folded position appears as a single rectangular unit of luggage. The electrical controls can be stowed in the handlebar frame with light control, speed control and regenerative braking mounted on the handlebars.

Figure 4:
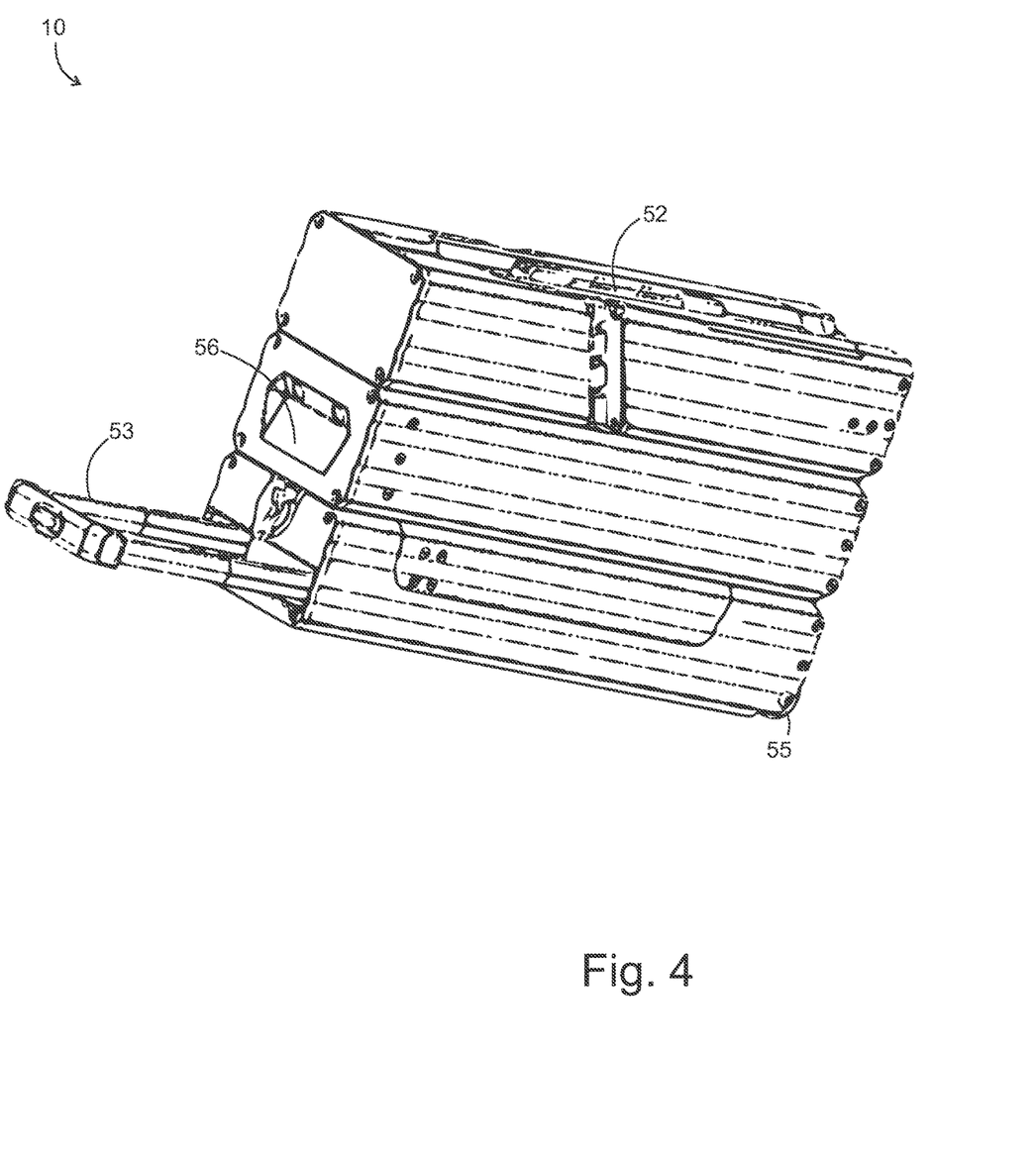
FIG. 4 is a left front perspective view of the present invention in rolling luggage configuration.

As seen in FIG. 4, the luggage lift handle 52 allows hoisting, and the luggage pull handle 53 allows rolling on the luggage wheels such as the left luggage wheel 55. Additionally, a battery release notch 56 can be formed as a latch for releasably disengaging a battery pack. The battery pack drives the wheels.

Figure 5:
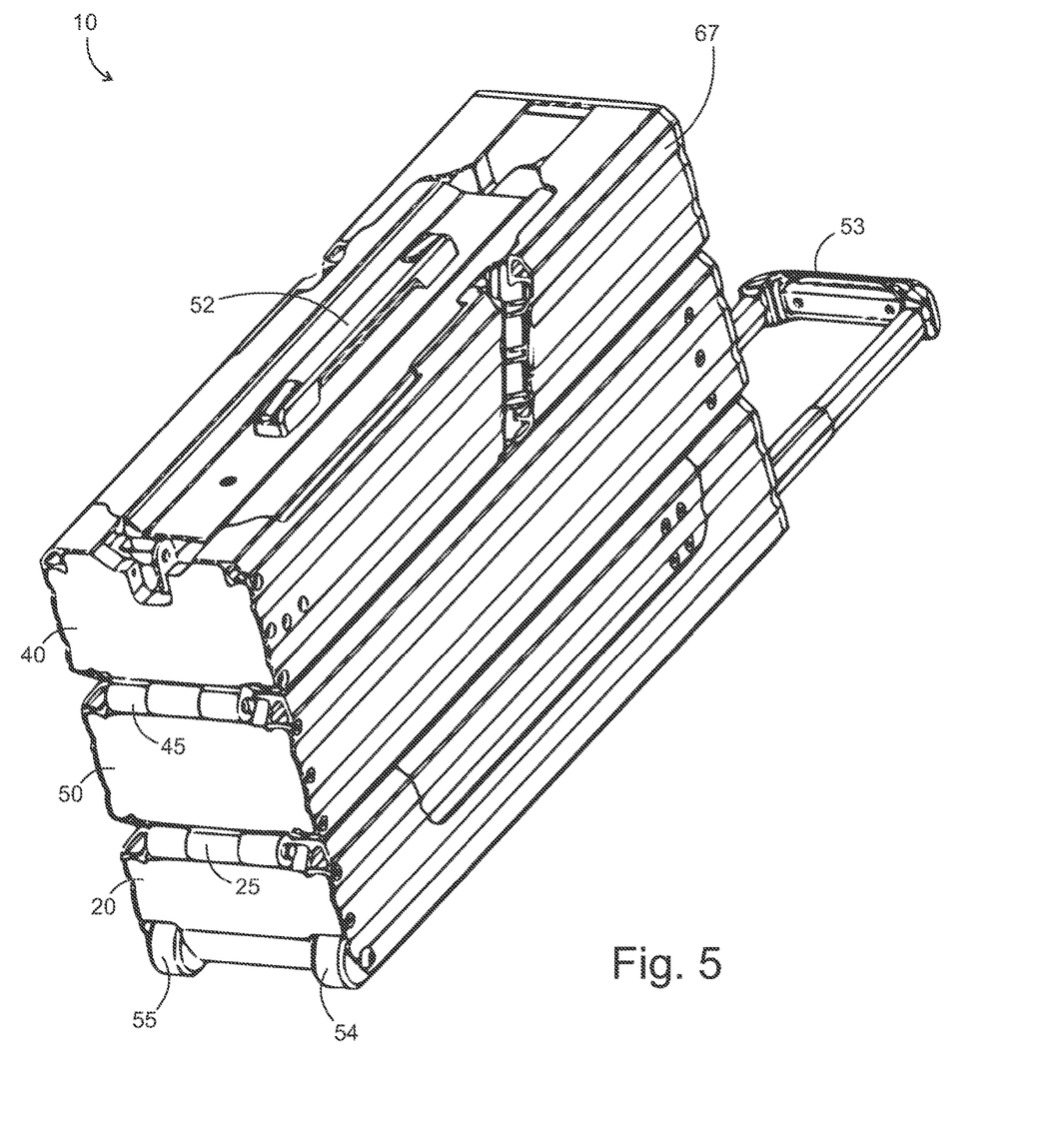
FIG. 5 is a right rear perspective view of the present invention in rolling luggage configuration.
Figure 6:
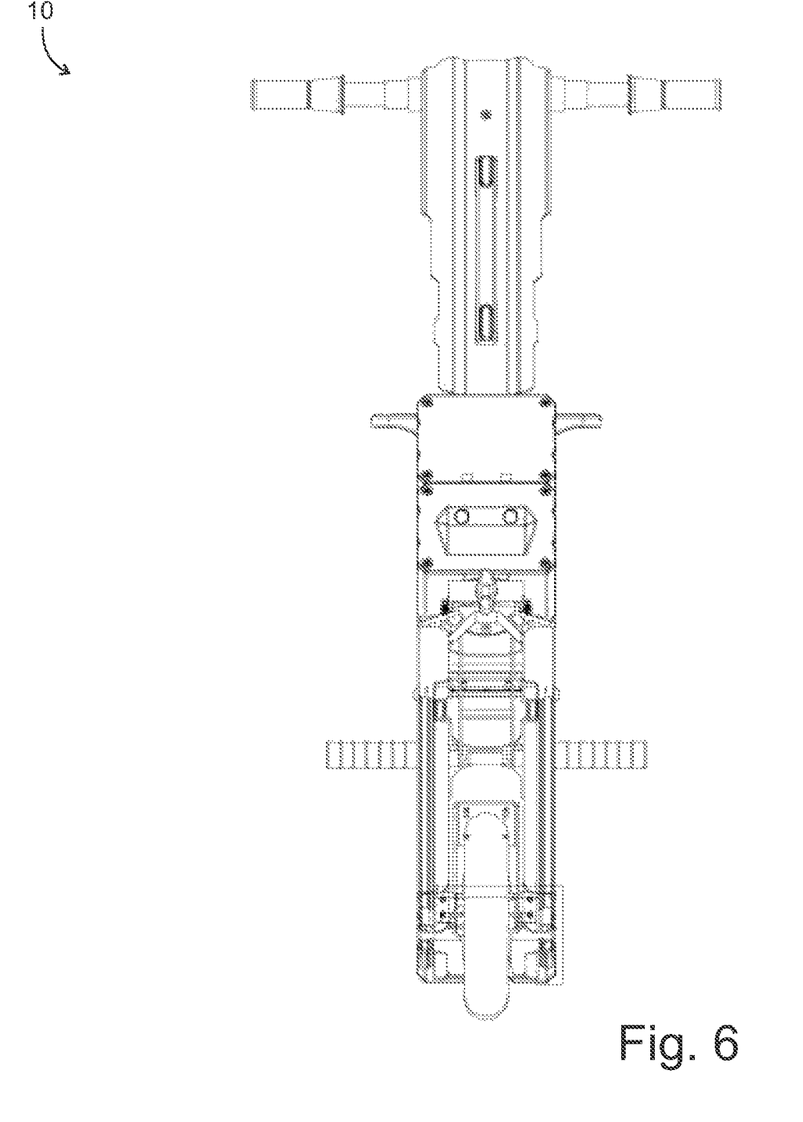
FIG. 6 is a front view of the present invention in scooter configuration.

As seen in FIG. 5, the luggage scooter 10 has a stacked configuration with a rear section 20 connected at a rear wheel frame joint 25 to a middle frame 50 above the rear section 20. The seat section 40 is connected to the middle frame 50 at the seat frame joint 45. The luggage lift handle 52 preferably extends lengthwise along a top of the luggage and is mounted on the handle bar cover 67. The luggage pull handle 53 allows use of the right luggage wheel 54 and the left luggage wheel 55. Therefore, when in luggage configuration, the seat section 40 is stacked above the middle frame 50, which is stacked above the rear section 20.

The invention claimed is:

1. A luggage scooter comprising:
   a middle frame;
   a front wheel section having a front wheel frame pivotally connected to the middle frame at a front wheel joint, wherein the front wheel frame is mounted to a steering joint, wherein the steering joint is mounted on the middle frame, wherein the steering joint provides steering in both a left and right direction, wherein the front wheel frame joint provides the front wheel frame with a configurable position between a stowed position and a deployed position;
   a front wheel mounted to the front wheel frame at a front wheel support;
   a rear wheel section having a rear wheel frame pivotally connected to the middle frame at a rear wheel frame joint, wherein the rear wheel frame pivots away from the front wheel frame when the rear wheel frame pivots from a stowed position to a deployed position;
   a seat section having a seat frame pivotally connected to the middle frame at a seat frame joint;
   and a handlebar section having a handlebar frame, wherein the handlebar frame is pivotally mounted to the middle frame, wherein the handlebar frame is configured to control the steering of the front wheel frame via the steering joint.

2. The luggage scooter of claim 1, wherein the rear wheel frame covers the front wheel frame when the rear wheel frame and the front wheel frame are both folded to a stowed position.

3. The luggage scooter of claim 1, wherein the seat joint is mounted at a corner edge of the middle frame.

4. The luggage scooter of claim 1, wherein the seat section has a seat top with a seat top left wing and a seat top right wing.

5. The luggage scooter of claim 1, wherein the seat frame includes a handlebar retainer socket configured to retain the handlebar frame when the handlebar frame is folded to a stowed position.

6. The luggage scooter of claim 1, wherein the rear wheel frame further includes a rear wheel frame top surface that forms a fender for covering the rear wheel.

7. The luggage scooter of claim 1, wherein the front wheel frame forms a fender for covering the front wheel.

8. The luggage scooter of claim 1, wherein the seat frame includes a seat bottom that abuts a rear wheel frame top surface formed on the rear wheel frame.

9. The luggage scooter of claim 1, further including a handlebar cover mounted above the middle frame, wherein the handlebar cover is parallel to the seat section when the seat section is in a stowed position.

10. The luggage scooter of claim 9, wherein the rear wheel frame covers the front wheel frame when the rear wheel frame and the front wheel frame are both folded to a stowed position.

11. The luggage scooter of claim 9, wherein the seat joint is mounted at a corner edge of the middle frame.

12. The luggage scooter of claim 9, wherein the seat section has a seat top with a seat top left wing and a seat top right wing.

13. The luggage scooter of claim 9, wherein the seat frame includes a handlebar retainer socket configured to retain the handlebar frame when the handlebar frame is folded to a stowed position.

14. The luggage scooter of claim 9, wherein the rear wheel frame further includes a rear wheel frame top surface that forms a fender for covering the rear wheel.

15. The luggage scooter of claim 9, wherein the front wheel frame forms a fender for covering the front wheel.

16. The luggage scooter of claim 9, wherein the seat frame includes a seat bottom that abuts a rear wheel frame top surface formed on the rear wheel frame.

17. A luggage scooter comprising:

a middle frame;

a front wheel section having a front wheel frame pivotally connected to the middle frame at a front wheel frame joint, wherein the front wheel frame is mounted to a steering joint, wherein the steering joint is mounted on the middle frame, wherein the steering joint provides steering in both a left and right direction, wherein the front wheel frame joint provides the front wheel frame with a configurable position between a stowed position and a deployed position;

a front wheel mounted to the front wheel frame at a front wheel support;

a rear wheel section having a rear wheel frame pivotally connected to the middle frame at a rear wheel frame joint, wherein the rear wheel frame pivots away from the front wheel frame when the rear wheel frame pivots from a stowed position to a deployed position;

a seat section having a seat frame pivotally connected to the middle frame at a seat frame joint;

a handlebar section having a handlebar frame, wherein the handlebar frame is pivotally mounted to the middle frame, wherein the handlebar frame is configured to control the steering of the front wheel frame via the steering joint, wherein the rear wheel frame covers the front wheel frame when the rear wheel frame and the front wheel frame are both folded to a stowed position, wherein the seat joint is mounted at a corner edge of the middle frame, wherein the seat section has a seat top with a seat top left wing and a seat top right wing, wherein the seat frame includes a handlebar retainer socket configured to retain the handlebar frame when the handlebar frame is folded to a stowed position, wherein the rear wheel frame further includes a rear wheel frame top surface that forms a fender for covering the rear wheel, wherein the front wheel frame forms a fender for covering the front wheel, wherein the seat frame includes a seat bottom that abuts a rear wheel frame top surface formed on the rear wheel frame, further including a handlebar cover mounted above the middle frame, wherein the handlebar cover is parallel to the seat section when the seat section is in a stowed position.

* * * * *